(12) United States Patent
Grimes et al.

(10) Patent No.: US 10,159,236 B2
(45) Date of Patent: Dec. 25, 2018

(54) BEVERAGE CONTAINER WITH HAND-LINE

(76) Inventors: Matthew J. Grimes, Union, KY (US); Timothy M. Kneale, Florence, KY (US)

( * ) Notice: Subject to any disclaimer, the term of this patent is extended or adjusted under 35 U.S.C. 154(b) by 693 days.

(21) Appl. No.: 13/325,331

(22) Filed: Dec. 14, 2011

(65) Prior Publication Data

US 2013/0153591 A1    Jun. 20, 2013

(51) Int. Cl.
| | | |
|---|---|---|
| *B65D 1/02* | (2006.01) | |
| *A01K 91/02* | (2006.01) | |
| *A01K 89/08* | (2006.01) | |
| *B65H 75/40* | (2006.01) | |
| *A45F 3/16* | (2006.01) | |
| *A45C 15/00* | (2006.01) | |

(52) U.S. Cl.
CPC ............ *A01K 91/02* (2013.01); *A01K 89/08* (2013.01); *A45F 3/16* (2013.01); *B65H 75/406* (2013.01); *A45C 15/00* (2013.01); *A45C 2200/20* (2013.01); *B65H 2402/41* (2013.01)

(58) Field of Classification Search
CPC ...... A01K 89/08; A01K 89/081; A01K 91/02; B65H 75/406; B65H 2402/41; A45F 3/16; A45C 2200/20; B65D 1/0223; B65D 1/0261
USPC .................. 215/382–384; 220/669
See application file for complete search history.

(56) References Cited

U.S. PATENT DOCUMENTS

| | | | |
|---|---|---|---|
| 2,561,237 A | 7/1951 | Shafer | 43/23 |
| 2,697,564 A | 12/1954 | Haney et al. | 242/96 |
| 2,712,908 A | 7/1955 | Kozminski | 242/99 |
| 3,179,351 A * | 4/1965 | Ehlert | 242/405.2 |
| 3,952,965 A | 4/1976 | Falcon | 242/96 |
| 4,607,449 A | 8/1986 | Brachear | |
| 4,688,740 A | 8/1987 | Weeks et al. | 242/96 |
| 4,951,890 A | 8/1990 | Sossamon | |
| 4,955,493 A * | 9/1990 | Touzani | 215/372 |
| 5,073,135 A * | 12/1991 | Parks | B63B 22/00 441/26 |
| 5,115,648 A * | 5/1992 | Salvucci | 63/15 |
| 5,188,551 A | 2/1993 | Keller | |
| 5,265,369 A | 11/1993 | Botkins | |
| 5,334,093 A | 8/1994 | Jensen et al. | 460/83 |
| 6,029,391 A | 2/2000 | Holley et al. | |
| 6,273,283 B1 * | 8/2001 | Terrana et al. | 215/383 |
| D455,812 S * | 4/2002 | Sanchez | D22/134 |
| 6,695,162 B1 * | 2/2004 | Boukobza et al. | 215/384 |
| 6,763,629 B1 * | 7/2004 | Bennett | 43/16 |
| 6,796,076 B1 | 9/2004 | Bennett | |
| 6,854,207 B1 | 2/2005 | Strope | |

(Continued)

OTHER PUBLICATIONS

Freshwater Fishing Regulations, South Carolina Department of Natural Resources, p. 23.*

(Continued)

*Primary Examiner* — Stephen Castellano

(74) *Attorney, Agent, or Firm* — Michael Ferrell; Ferrells, PLLC

(57) ABSTRACT

A beverage container useful for fishing includes a recessed channel for receiving and dispensing fishing line. The container with a fishing line spool is configured such that a hand-line-fishing device is provided without the need for a fishing pole. Optionally, the spool is removable from the beverage container body and may be rotatably mounted with respect thereto.

19 Claims, 4 Drawing Sheets

(56) References Cited

U.S. PATENT DOCUMENTS

| | | | |
|---|---|---|---|
| D505,178 S * | 5/2005 | Smyth | D22/134 |
| 7,387,275 B1 * | 6/2008 | Hui | 242/588.3 |
| 2003/0071008 A1 * | 4/2003 | Guido et al. | 215/376 |
| 2005/0063176 A1 * | 3/2005 | Sutton | 362/101 |
| 2006/0016819 A1 * | 1/2006 | Paslawski et al. | 220/666 |
| 2008/0006601 A1 * | 1/2008 | Stoddard | 215/383 |
| 2008/0025018 A1 | 1/2008 | Sandy | 362/157 |
| 2009/0014407 A1 * | 1/2009 | Strasser et al. | 215/381 |
| 2009/0053365 A1 | 2/2009 | Hurwitz et al. | 426/73 |
| 2009/0134111 A1 * | 5/2009 | Schroeder | 215/10 |

OTHER PUBLICATIONS

International Search Report and Written Opinion of the International Searching Authority, dated Mar. 11, 2013.

* cited by examiner

BEVERAGE CONTAINER WITH HAND-LINE

FIELD OF THE INVENTION

The invention pertains, in part, to the field of fishing tackle, specifically to a beverage container useful for fishing, wherein the beverage container is appropriately sized and dimensioned and provided with a recessed channel for receiving fishing line. The line can be cast, dispensed, and reeled in by hand without the use of a fishing pole.

BACKGROUND

Resealable containers with removable lids and an orifice which can be opened for beverage access via a sliding motion and without removing the cap from the container are known. There are numerous patents describing resealable containers for storage of beverages with additional features, including United States Patent Publication No. 2009/0053365, which discloses a cylindrical bottle with a tethered cap and peel away food packages. United States Patent Publication No. 2008/0025018 discloses a resealable container which also contains a receptacle holding a light emitting device and power source, and a storage compartment. On the other hand, known hand-line-fishing devices are typically provided as separate, single utility items, as is discussed below.

It is known for homemade hand fishing devices to utilize a bottle as a winding device for fishing line such that the line is wound around and exposed about the perimeter of the bottle. However, conventional beverage or other containers lack the features of the present invention and as such are of limited utility. For example, exposed line wound onto a bottle is not secure and is easily dislodged from the perimeter of a bottle during transport or use, resulting in a tangled mass which is difficult and time consuming to restore. Accordingly, hand held fishing devices have spooling features to secure the line as is seen, for example in U.S. Pat. Nos. 2,561,237; 2,697,564; 2,712,908; 3,952,965; 4,688,740 and 5,334,093. It is seen from these patents that prior art hand-line-fishing devices are single-use items with separate grips, line guides and so forth that make them relatively bulky and inconvenient to carry while hiking, backpacking or bicycling when available cargo space and carrying capacity is limited.

SUMMARY OF INVENTION

There is provided in accordance with the present invention a beverage container useful for fishing which includes a recessed channel defining a spool adapted for receiving and dispensing fishing line. The spool is recessed to secure and shield the line from exposure to rubbing or other stresses which might dislodge the line. The container with a fishing line spool is configured such that a hand-line-fishing device is provided without the need for a fishing pole. Optionally, the spool is removable from the beverage container body and may be rotatably mounted with respect thereto.

Among the features and advantages of the invention are that the beverage container body is useful as a grip and casting device and that it is not necessary to have a dedicated fishing apparatus when the beverage container/hand-line of the invention is used on recreational outings. A beverage container is usually a necessary or preferred item in any event. The hand-line-fishing device of the invention adds little bulk that needs to be packed and carried, thus conveniently providing for additional recreational activity.

Further features and advantages will become apparent from the discussion which follows.

BRIEF DESCRIPTION OF DRAWINGS

The invention is described in detail below with reference to the drawings, wherein like numerals designate similar parts and wherein.

DESCRIPTION OF THE INVENTION

Figures 1, 2:
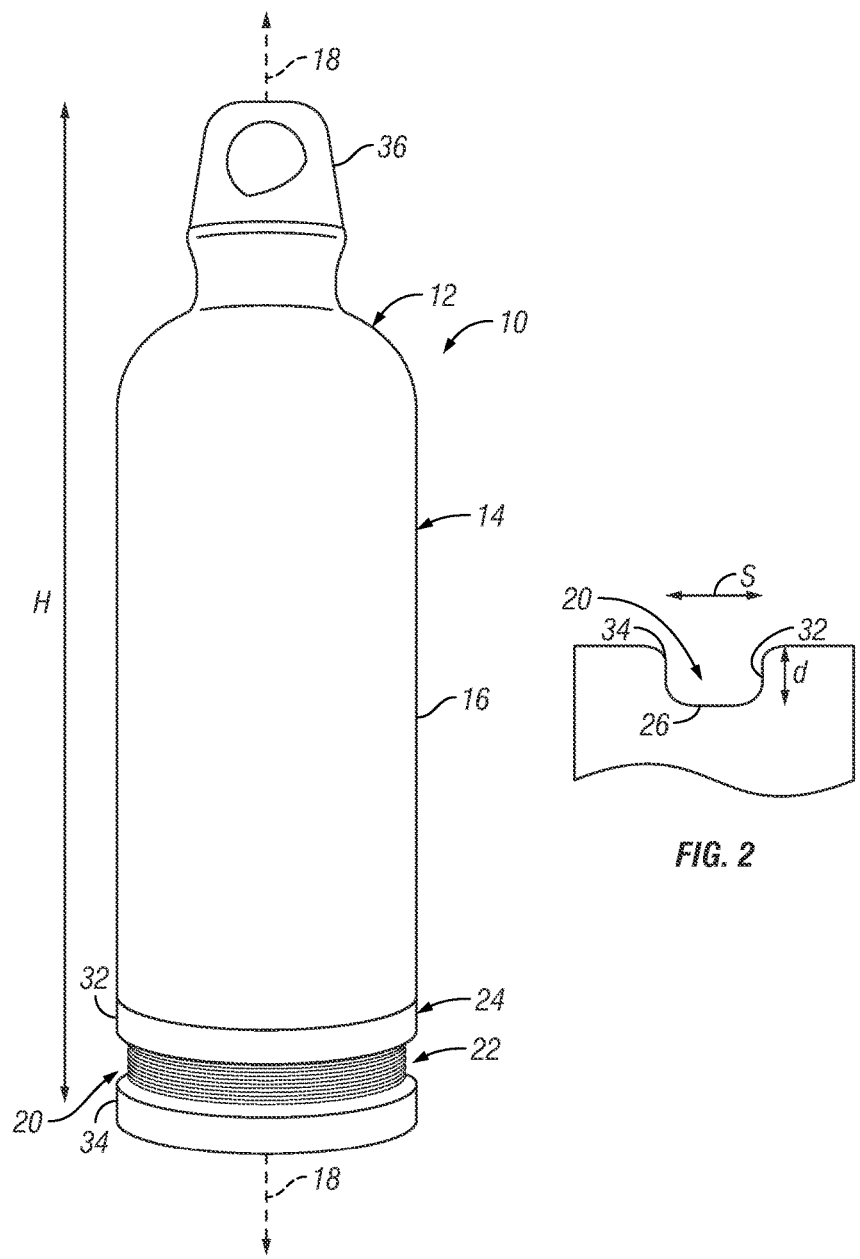
FIG. 1 is a view in elevation of a first embodiment of the beverage container with hand-line constructed in accordance with the present invention.
FIG. 2 is a schematic view of the profile of the beverage container with hand-line of FIG. 1 showing the channel of the container of FIG. 1.

The invention is described in detail below with reference to the drawings. Such discussion is for purposes of illustration only. Modifications within the spirit and scope of the present invention, set forth in the appended claims, will be readily apparent to one of skill in the art. Terminology used throughout the specification and claims herein is given its ordinary meaning.

As used herein, "characteristic diameter" and like terminology refers to the diameter of a cylindrical container consistent with ordinary usage of the term, and with respect to containers of more complex or other shapes and cross sections, to the diameter of a cylinder of equal volume having the same height.

"Recessed" refers to the channel configuration which has a spooling surface inwardly disposed with respect to the outer portions of the channel sidewalls as seen in the various Figures.

The present invention generally includes a container of volume between about 80 and 4000 milliliters (ml), suitable for beverages, having about its perimeter a channel or retaining area for at least one meter of fishing line of a diameter less than about 2 mm having tensile value between about 2 and 800 newtons.

The container of the present invention may be made of any suitable material or materials, and may have any shape consistent with the essential criteria herein enumerated. Without intending to limit the invention, exemplary materials may include aluminum, steel, stainless steel, glass, ceramics, wood, bamboo, organic fibers, inorganic fibers, polyethylene, polypropylene, polyvinyl chloride, polyethylene terephthalate, other polymers or combinations of polymers, or any combination of the above or other materials, including multilayer constructions, blends, filled compounds, alloys, and so on. Preferred materials include polymers. Especially preferred are polymers with a density of less than water, including polyethylene and polypropylene.

The container and components of the invention may be blow molded, extruded, injection molded, or formed by any known method suitable for the materials employed.

Cylindrical containers are preferred. Especially preferred is a cylindrical container with a ratio of height to diameter of between 2 and 6.

The channel or recess of the invention container may be of any suitable depth and width. It preferably includes one or more fitments suitable for retaining at least one end of the fishing line. Preferred such fitments include slits, grooves, posts, tabs, clips, holes, eyelets, rings, adhesive areas, textured areas, high friction areas, and elastic devices, and are preferably located external to the container, but inside the maximum outer diameter of the container. In some embodiments, a hole through the spooling portion of the device will serve to anchor the line, so long as the hole is isolated from the container. The channel itself is of a depth sufficient to retain a suitable amount of fishing line. The channel may be part of the outer wall of the container itself, or may be attached or restrained in close proximity to the outer wall of the container. If not part of the container wall itself, the channel may optionally be attached in such a way as to allow it to freely rotate about the container, and/or optionally driven or braked in its motions about the container by hand or by frictional or manually driven mechanisms of any sort. Suitable braking and cranking features are seen in U.S. Pat. No. 3,952,965 to Falcon as well as U.S. Pat. No. 4,688,740 to Weeks et al., the disclosures of which are incorporated herein by reference. At least one wall of the channel is designed in such a manner as to allow easy withdrawal of fishing line when a force is exerted upon said line in a direction parallel to the long (height in above paragraph) axis of the container. Said wall is preferably the wall of the channel toward the lower end of the device. Preferred channels have a uniform depth and profile around the vertical axis of the container. Especially preferred is a channel which is composed of the container outer wall itself. The channel has a depth of between 10% and 30% of a radius of a substantially round cylindrical container, with surfaces defining an angle of generally less than 45 degrees with the axis of the container at the bottom of the channel and defining an angle of 45 degrees or greater with the axis of the container at the outer walls of the channel. Optionally, the channel has a small tab with a hole to aid in retention of the inner end of the fishing line, and the channel is perhaps most preferably disposed within 10 cm or less from the lower end of the container.

Optionally, the present invention may include a fitment or device for coverage or retention of the outer end of the fishing line as well. Without intending to limit the invention, said device or fitment may be comprised of one or more tabs, slits, sliding sleeves, elastic devices or fitments, elastic sleeves, adhesive areas, or any suitable feature.

Fishing line useful in connection with the invention may be composed of any suitable material or combination of materials, and may have one or more filaments, each of which may be homogeneous, coextruded, blended, adhered, laminated, braided, or combined in any fashion. A preferred product is nylon monofilament line having a tensile value of from about 15 newtons to about 100 newtons. The channel is sized to receive anywhere from about 5 meters to about 100 meters of line in most cases.

Tensile value is the force required to cause failure or breakage of the fishing line.

Figure 3:
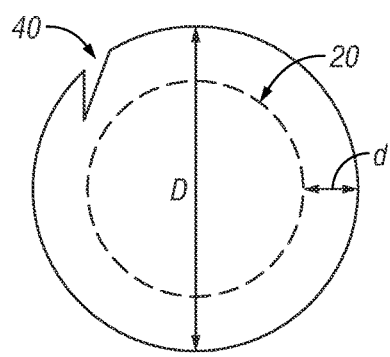
FIG. 3 is a bottom schematic view of the container with hand-line of FIG. 1 illustrating the diameter of the beverage container and the depth of the channel for the fishing line as well as a retaining slot.

Referring to FIGS. 1-3, there is shown a beverage container and hand-line-fishing device 10 which includes a resealable beverage container 12 with an elongated tubular container body 14 having a sidewall 16 and defining a central axis 18. The beverage container typically has a fill volume of not less than 80 ml nor more than 4000 ml as well as a recessed channel 20 disposed around central axis 18 of container body 14 configured to spool fishing line indicated at 22. The recessed channel usually has from 5 meters to 100 meters, suitably 10 meters to 30 meters of fishing line spooled therein.

The container body may be cylindrical, with a circular sidewall of diameter, D, and the recessed channel is circular and juxtaposed with a lower terminus 24 of the cylindrical sidewall of the container body and is configured such that the channel surfaces have a perimeter at their inner portions with a diameter less than diameter, D, and extend inwardly a depth, d, such that the ratio of d/D is typically from 0.4 to 0.1 and preferably the ratio of d/D is from 0.4 to 0.15. Typically, the container body has a height, H, and the ratio of H/D is from 2 to 6, suitably from 2.2 to 4, while the recessed channel has a span S of from about 1 cm to about 4 or 6 cm between its upper and lower walls, 32, 34. In preferred embodiments, the container body has a height H from about 15 cm to about 30 cm and a diameter of from 5 cm to 9 cm.

Optionally, the container sidewall is ergonomically shaped and/or tapered, so as to provide a better hand fit and grip, as well as to provide for superior appearance as discussed in connection with FIG. 6.

In the embodiment shown in FIGS. 1-3, the sidewall of the container body defines the recessed channel which holds the fishing line. In other words, the device has a monolithic construction (except for a removable cap 36). The container may be fabricated with the sidewall channel by injection blow-molding wherein the channel is integral with the container body. The channel lower wall optionally has a slot 40 to secure the end of the fishing line if so desired.

Figure 4:
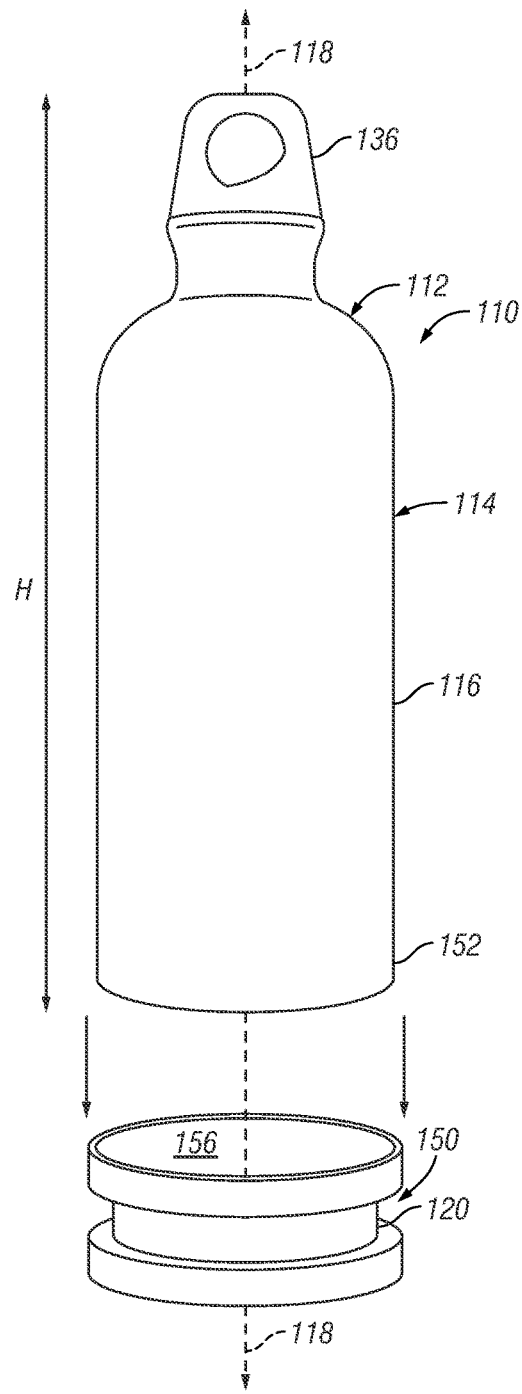
FIG. 4 is an exploded view in elevation of an alternate construction of the beverage container with hand-line of the present invention.
Figures 5, 6:
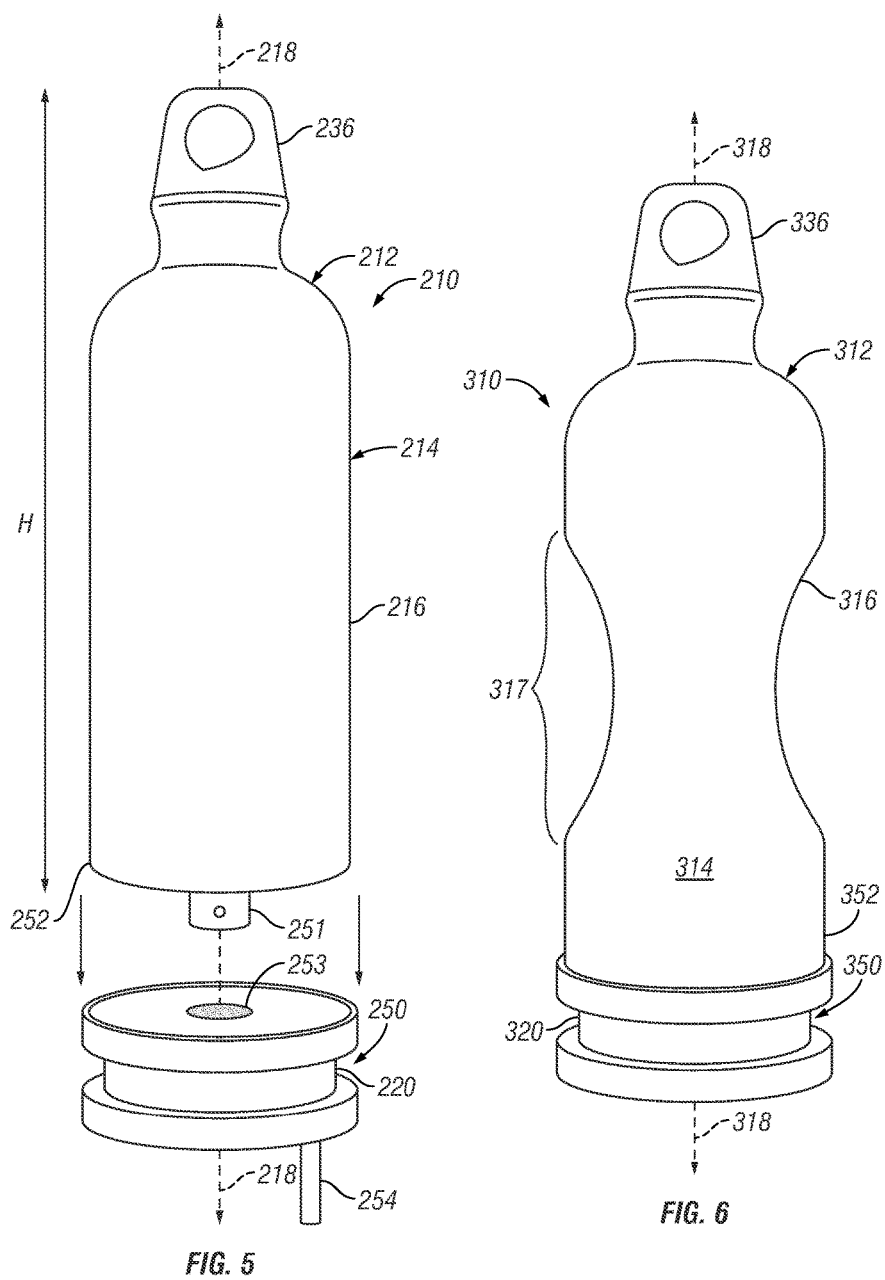
FIG. 5 is an exploded view of yet another construction of the beverage container with hand-line of the present invention.
FIG. 6 is a view in elevation of still yet another construction of the beverage container with hand-line of the present invention.

In the embodiments of FIGS. 4 and 5, there is shown a two (2) piece construction of the container body and a spooling member wherein the container body may be made by blow-molding and the spooling member may be injection molded. The spooling member is optionally detachably mounted to the beverage container.

There is shown in FIG. 4 a beverage container and hand-line-fishing device 110 including a resealable beverage container 112 with an elongated tubular container body 114 having a sidewall 116 and defining a central axis 118. A separate spooling member 150 is mounted to a lower terminus 152 of the container body and has a recessed channel 120 disposed around central axis 118 of the container body configured to spool fishing line. The container also has a removable cap 136, which may be threaded, friction fit or attached by any suitable means.

Spooling member 150 is removable and may be separately fabricated and sold for use with available beverage containers, if so desired. In this regard, spooling member 150 has a cavity 156 sized to fit conventional water bottles. The device of FIG. 4 has generally the dimensions discussed in connection with the embodiment of FIGS. 1-3.

There is shown in FIG. 5 yet another beverage container and hand-line-fishing device 210 including a resealable beverage container 212 with an elongated tubular container body 214 having a sidewall 216 and defining a central axis 218. A separate spooling member 250 is rotatably mounted via a shaft 251 to a lower terminus 252 of the container body via a mounting bearing 253 and likewise has a recessed channel 220 disposed around central axis 218 of the container body configured to spool fishing line. There is optionally provided a hinged crank 254 which may be folded out to use to rotate spool member 250 with respect to the container body if so desired and folded in during transport or when not fishing with the device. Alternatively, the spool could be provided with one or more cavities sized to receive a finger which can rotate the spool, much like dialing a telephone of the class used in the last century, that is, those with a rotating dial plate. The container also has a removable cap 236, which may be threaded, friction fit or attached by any suitable means as noted above.

The device of FIG. 5 also has generally the dimensions discussed in connection with the embodiment of FIGS. 1-3.

There is shown in FIG. 6 yet another beverage container and hand-line-fishing device 310 including a resealable beverage container 312 with an elongated tubular container body 314 having a tapered sidewall 316 and defining a central axis 318. A spooling portion 350 is juxtaposed with a lower terminus 352 of the container body and has a recessed channel 320 disposed around central axis 318 of the container body configured to spool fishing line. The container also has a removable cap 336, which may be threaded, friction fit or attached by any suitable means as noted above.

The device of FIG. 6 also has generally the dimensions discussed in connection with the embodiment of FIGS. 1-3, with tapered sidewall 316 having a double arcuate taper as shown defining a grip portion at 317 adapted for use as a hand grip during casting out and reeling in the line. The arcuate inward taper of grip portion 317 is apparent when the device is viewed in elevation as is shown in FIG. 6.

Figure 7A:
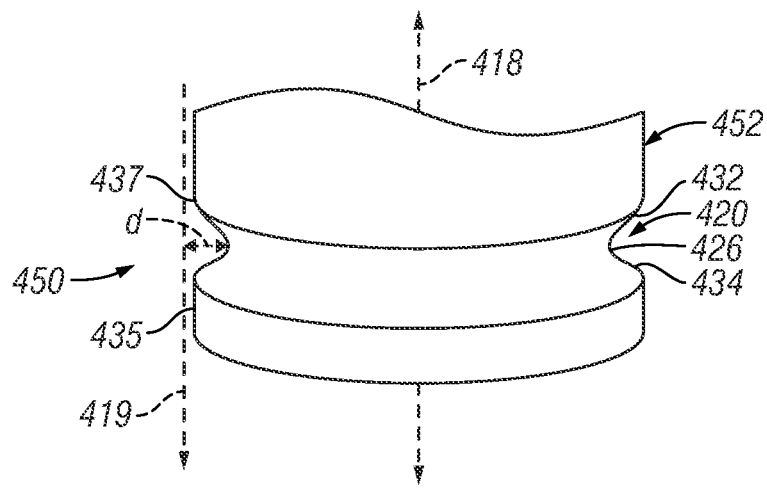
FIGS. 7A and 7B are schematic views illustrating geometries of the recessed channel of the beverage container and fishing device of the present invention.
Figure 7B:
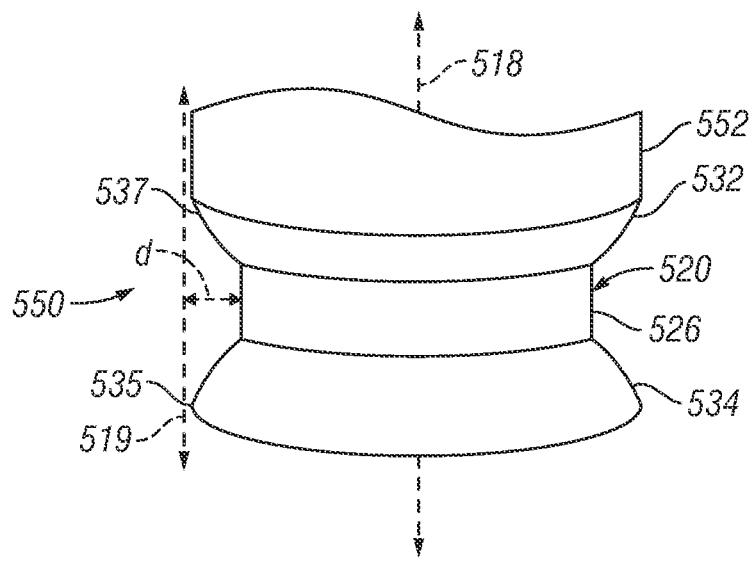

Additional channel configurations which have taper and are preferred in many cases and which may be used in connection with any of the foregoing embodiments are illustrated in FIG. 7A and FIG. 7B. In FIG. 7A there is shown a spooling portion 450 adjacent a lower terminus 452 of a container body. Portion 450 defines a recessed channel 420 having a central portion 426 and a pair of arcuate sidewalls 432, 434 extending outwardly to their outermost portions 435, 437. The depth or degree of recess, of the channel, d is measured at its centermost portion (maximum depth) equidistant from portions 435, 437 along a perpendicular from a line 419 parallel to the axis of the container body 418 at the outermost extension of the portions 435, 437 as shown.

In FIG. 7B there is shown another spooling portion 550 adjacent a lower terminus 552 of a container body. Portion 550 defines a recessed channel 520 having a central portion 526 a pair of sloped sidewalls 532, 534 extending outwardly to their outermost portions 535, 537. The sloped sidewalls 532, 534 of recessed channel 520 are convex outwardly when the device is viewed in elevation as is shown in FIG. 7B. The depth or degree of recess, of the channel, d is measured at its cylindrical (flat) center portion from portions 535, 537 along a perpendicular from a line 519 parallel to the axis of the container body 518 at the outermost extension of the portions 535, 537 as shown. It is appreciated from FIG. 7B that the central cylindrical portion of recess 520 thus has a flat axial profile parallel to the longitudinal axis 518 of the container. Preferably, the recessed channel has a depth of at least 1 cm extending over a span S of at least 1 cm or 2 cm.

ADDITIONAL EMBODIMENTS

Following is a listing of embodiments specifically contemplated to be within the scope and spirit of the present invention:

1. An article comprising the following features:
    a) a container with a volume of not less than about 80 ml nor more than 4000 ml, having at least one opening suitable for filling and emptying the container;
    b) a channel or retaining apparatus distributed about the perimeter of the article in such a way as to enable the storage of fishing line having a minimum tensile value of 2N and a maximum tensile value of 800N.
2. The article of embodiment 1, in which the container is substantially cylindrical.
3. The article of embodiment 1, in which the container is substantially rigid.
4. The article of embodiment 1, in which the container is flexible.
5. The article of embodiment 1, comprising at least one cap or fitment to access the liquid.
6. The article of embodiment 1, comprising at least one cap to access the liquid, said cap providing a way to access the liquid inside the container without removal of the cap.
7. The article of embodiment 1, additionally comprising at least one fitment suitable for use in attaching the article to another object or to one's person.
8. The article of embodiment 1, additionally comprising a mechanism or device for covering the fishing line when not in use.
9. The article of embodiment 1, additionally comprising a mechanism for securing one or both ends of the fishing line.
10. The article of embodiment 1, additionally comprising at least one storage receptacle suitable for solid articles.
11. The article of embodiment 1, additionally comprising a storage receptacle with a closing mechanism or device, suitable for solid articles.
12. The article of Embodiment 1, in which the feature 1b is removable.
13. The article of Embodiment 1, in which the feature 1b can rotate about the container.
14. The article of Embodiment 1, in which the feature 1b can be rotated about the device by means of a crank or other mechanism.
15. The article of Embodiment 1, in which the rotation speed of feature 1b can be controlled by means of a brake or other mechanism.
16. The article of embodiment 1, in which the article as a whole is buoyant in water.
17. The article of embodiment 1, in which the article is buoyant in water when the container is filled with water.
18. The article of embodiment 1, also comprising two or more of the features of the intervening embodiments, to the extent that none of said features are mutually exclusive.

Nothing herein is intended to exclude the addition of other useful features to the article of this invention. Exemplary but not constraining additional features include lights of any nature, clips or fasteners, GPS devices, fish attractants, fish detectors, RFID (radio frequency identification) or other identification and location devices, food storage, tackle storage, additional openings, drains, sound emitters, fish cleaning features, insulation, cooling, heating, floating, and the like as is apparent to one familiar with the art. While the invention has been described in detail, modifications within the spirit and scope of the invention will be readily apparent to those of skill in the art. In view of the foregoing discussion, relevant knowledge in the art and references discussed above in connection with the Background and Detailed Description, the disclosures of which are all incorporated herein by reference, further description is deemed unnecessary. In addition, it should be understood that aspects of the invention and portions of various embodiments may be combined or interchanged either in whole or in part. Furthermore, those of ordinary skill in the art will appreciate that the foregoing description is by way of example only, and is not intended to limit the invention.

What is claimed is:

1. A beverage container and hand-line-fishing device comprising:
    (a) a resealable beverage container with an elongated, tubular container body, the beverage container having a fill volume of not less than 80 ml nor more than 4000 ml, said container having a resealable opening at an upper end thereof, said resealable opening being configured and positioned to open into said elongated, tubular container body, said beverage container being of unitary construction and thereby defining a single compartment;
    (b) a spooling member mounted to the container body having a recessed channel configured to spool fishing line, wherein the channel has a depth of at least 0.5 cm and a span of at least 1 cm; and wherein the recessed channel defines a cylindrical spooling portion with a flat axial profile about its central portion, the flat axial profile of the central portion of the cylindrical spooling portion being parallel to a longitudinal axis of the tubular container body; and
    c) a recessed gripping portion located between the upper end of the container and the recessed channel of the spooling member, said recessed gripping portion having an arcuate inward taper so as to be adapted for use as a hand grip during casting out and reeling in fishing line,
    wherein the elongated, tubular container body is dimensioned so as to be useful as a gripping and casting device and wherein further the spooling member is mounted to a lower terminus of the beverage container body and the recessed channel has from 5 meters to 100 meters of fishing line spooled therein such that the line is recessed inwardly with respect to the container sidewall.

2. The beverage container and hand-line-fishing device according to claim 1, wherein the spooling member is rotatably mounted to the beverage container body.

3. The beverage container and hand-line-fishing device according to claim 1, wherein the elongated, tubular container body further defines a gripping recess about a medial portion thereof.

4. A beverage container and hand-line-fishing device comprising:
    (a) a resealable beverage container with an elongated, tubular container body having a sidewall and having a characteristic diameter, D, the beverage container having a fill volume of not less than 80 ml nor more than 4000 ml, said container having a resealable opening at an upper end thereof, said resealable opening being configured and positioned to open into said elongated, tubular container body;
    (b) a recessed channel disposed about the container body or juxtaposed therewith, located adjacent a lower end of the container body distal to said upper end configured to spool fishing line, wherein the channel defines a depth of at least 0.5 cm and a span of at least 1 cm; and wherein the recessed channel has a cylindrical spooling portion with a flat axial profile about its central portion, the flat axial profile of the central portion of the cylindrical spooling portion being parallel to a longitudinal axis of the tubular container body; and
    c) a recessed gripping portion located between the upper end of the container and the recessed channel of the spooling member, said recessed gripping portion having an arcuate inward taper so as to be adapted for use as a hand grip during casting out and reeling in fishing line,
    wherein the elongated, tubular container body is dimensioned so as to be useful as a gripping and casting device and wherein further the recessed channel has from 5 meters to 100 meters of fishing line spooled therein such that the line is recessed inwardly with respect to the container sidewall, said beverage container and hand-line fishing device being further characterized by a monolithic construction.

5. The beverage container and hand-line-fishing device according to claim 1, wherein the depth of the recessed channel is at least 1 cm.

6. The beverage container and hand-line-fishing device according to claim 1, wherein the depth of the recessed channel is at least 2 cm.

7. The beverage container and hand-line-fishing device according to claim 1, wherein the depth of the recessed channel is from 1 cm to 3 cm.

8. The beverage container and hand-line-fishing device according to claim 1, wherein the span of the recessed channel is from 1 cm to 6 cm.

9. The beverage container and hand-line-fishing device according to claim 8, wherein the span of the recessed channel is at least 2 cm.

10. The beverage container and hand-line-fishing device according to claim 8, wherein the span of the recessed channel is at least 3 cm.

11. The beverage container and hand-line-fishing device according to claim 1, wherein the elongated, tubular container body is cylindrical.

12. The beverage container and hand-line-fishing device according to claim 1, wherein the recessed channel is circular and juxtaposed with a lower terminus of the sidewall of the container body and is configured such that the channel surfaces have a perimeter at their inner portions with a diameter less than characteristic diameter, D, and extend inwardly the depth, d, such that the ratio of d/D is from 0.4 to 0.1.

13. The beverage container and hand-line-fishing device according to claim 1, wherein the recessed channel is circular and juxtaposed with a lower terminus of the cylindrical sidewall of the container body and is configured such that the channel surfaces have a perimeter at their inner portions with a diameter less than characteristic diameter, D, and extend inwardly the depth, d, such that the ratio of d/D is from 0.4 to 0.15.

14. The beverage container and hand-line-fishing device according to claim 1, wherein the container body has a height, H, and the ratio of H/D is from 2 to 6.

15. The beverage container and hand-line-fishing device according to claim 14, wherein H is from about 15 cm to about 30 cm and D is from 5 cm to 9 cm.

16. The beverage container and hand-line-fishing device according to claim 1, wherein the sidewall of the container body defines the recessed channel.

17. The beverage container and hand-line-fishing device according to claim 1, wherein the recessed channel has a lower sidewall extending downwardly and outwardly, said lower sidewall being convex outwardly with respect to the longitudinal axis of the container.

18. The beverage container and hand-line-fishing device according to claim 1, wherein the recessed channel is circular and juxtaposed with a lower terminus of the cylindrical sidewall of the container body and is configured such that the channel surfaces have a perimeter at their inner portions with a diameter less than characteristic diameter, D, and extend inwardly the depth, d, such that the ratio of d/D is from 0.4 to 0.15, the container body has a height, H, and the ratio of H/D is from 2.2 to 4 and H is from about 15 cm to about 30 cm and D is from 5 cm to 9 cm, and the sidewall of the container body defines the recessed channel.

19. A beverage container and hand-line-fishing device comprising:
(a) a resealable beverage container with an elongated, tubular container body having a sidewall and having a characteristic diameter, D, the beverage container having a fill volume of not less than 80 ml nor more than 4000 ml, said container having a resealable opening at an upper end thereof, said resealable opening being configured and positioned to open directly into said elongated, tubular container body;
(b) a recessed channel disposed about the container body or juxtaposed therewith, located adjacent a lower end of the container body distal to said upper end configured to spool fishing line, wherein the channel has a depth, d, of at least 0.5 cm and a span of at least 1 cm; and wherein the recessed channel defines a cylindrical spooling portion with a substantially flat axial profile about its central portion, the flat axial profile of the central portion of the cylindrical spooling portion being parallel to a longitudinal axis of the tubular container body; and
c) a recessed gripping portion located between the upper end of the container and the recessed channel of the spooling member, said recessed gripping portion having an arcuate inward taper so as to be adapted for use as a hand grip during casting out and reeling in fishing line, wherein the elongated, tubular container body is dimensioned so as to be useful as a gripping and casting device and wherein further the recessed channel has from 5 meters to 100 meters of fishing line spooled therein such that the line is recessed inwardly with respect to the container sidewall, said beverage container and hand-line fishing device being further characterized in that the ratio of d/D is from 0.4 to 0.15, the container body has a height, H, and the ratio of H/D is from 2.2 to 4 and H is from about 15 cm to about 30 cm and D is from 5 cm to 9 cm and wherein the recessed channel has a lower sidewall extending downwardly and outwardly, said lower sidewall being convex outwardly with respect to the longitudinal axis of the container.

* * * * *